(12) United States Patent
Vasseur et al.

(10) Patent No.: US 8,355,315 B2
(45) Date of Patent: Jan. 15, 2013

(54) FAILURE PROTECTION FOR P2MP TUNNEL TAIL-END NODE

(75) Inventors: Jean-Phillippe Vasseur, Dunstable, MA (US); Alton Lo, Fremont, CA (US); Mohammed Azhar Sayeed, Shrewsbury, MA (US)

(73) Assignee: Cisco Technology, Inc., San Jose, CA (US)

( * ) Notice: Subject to any disclaimer, the term of this patent is extended or adjusted under 35 U.S.C. 154(b) by 1228 days.

(21) Appl. No.: 11/604,622

(22) Filed: Nov. 27, 2006

(65) Prior Publication Data

US 2008/0123521 A1 May 29, 2008

(51) Int. Cl.
*G01R 31/08* (2006.01)
(52) U.S. Cl. ........................ 370/217; 370/219; 370/220
(58) Field of Classification Search .......... 370/216–221, 370/225
See application file for complete search history.

(56) References Cited

U.S. PATENT DOCUMENTS

| | | | | |
|---|---|---|---|---|
| 6,262,997 | B1* | 7/2001 | Quayle | ........................ 370/503 |
| 6,778,492 | B2 | 8/2004 | Charny et al. | |
| 6,978,394 | B1 | 12/2005 | Charny et al. | |
| 7,054,262 | B2 | 5/2006 | Gerstel | |
| 7,099,286 | B1 | 8/2006 | Swallow | |
| 7,120,151 | B1 | 10/2006 | Ginjpalli et al. | |
| 2003/0088698 | A1* | 5/2003 | Singh et al. | ..................... 709/239 |
| 2003/0126287 | A1 | 7/2003 | Charny et al. | |
| 2003/0233595 | A1 | 12/2003 | Charny et al. | |
| 2005/0083928 | A1 | 4/2005 | Sivabalan et al. | |
| 2005/0111351 | A1* | 5/2005 | Shen | ............................. 370/217 |
| 2007/0237160 | A1* | 10/2007 | Natarajan et al. | ............. 370/397 |
| 2008/0049763 | A1* | 2/2008 | Damm et al. | .................. 370/400 |
| 2008/0107017 | A1* | 5/2008 | Yuan et al. | ..................... 370/228 |

OTHER PUBLICATIONS

Awduche, D. et al., Request for Comments 3209, entitled "RSVP-TE: Extensions to RSVP for LSP Tunnels", Network Working Group, IETF, Dec. 2001, pp. 1-57.
Smit, H. et al., Request for Comments 3784, entitled "Intermediate System to Intermediate System (IS-IS) Extensions for Traffic Engineering (TE)", Network Working Group, IETF, Jun. 2004, pp. 1-13.
Katz, D. et al., Request for Comments 3630, entitled "Traffic Engineering.(TE) Extensions to OSPF Version 2", Network Working Group, IETF, Sep. 2003, pp. 1-14.
Berger, L., Request for Comments 3473, entitled "Generalized Multi-Protocol Label Switching (GMPLS) Signaling Resource ReserVation Protocol-Traffic Engineering (RSVP-TE) Extensions", Network Working Group, IETF, Jan. 2003, pp. 1-40.
Braden, R. et al., Request for Comments 2205, entitled "Resource ReSerVation Protocol (RSVP)—Version 1 Functional Specification", Network Working Group, IETF, Sep. 1997, pp. 1-105.
Vasseur, JP. et al., Internet-Draft, entitled "Path Computation Element (PCE) Communication Protocol (PCEP)—Version 1 (draft-ietf-pce-peep-03txt)", Network Working Group, IETF, Oct. 2006, pp. 1-61.

* cited by examiner

*Primary Examiner* — David Oveissi
(74) *Attorney, Agent, or Firm* — Cesari and McKenna, LLP

(57) ABSTRACT

In one embodiment, a primary tail-end node (PTE) of a point-to-multipoint (P2MP) tunnel selects a backup tail-end node (BTE) from one or more BTEs that are configured to forward traffic to a same multicast network as the PTE. The PTE then determines a branching node of the P2MP tunnel to reach the PTE and the selected BTE, and notifies the branching node of the selected BTE. In response, the branching node establishes a backup tunnel to the selected BTE, and redirects P2MP traffic onto the backup tunnel to the selected BTE in response to a detected failure of the PTE.

19 Claims, 7 Drawing Sheets

US 8,355,315 B2

FAILURE PROTECTION FOR P2MP TUNNEL TAIL-END NODE

TECHNICAL FIELD

The present disclosure relates generally to computer networks, and, more particularly, to tail-end node protection of point-to-multipoint (P2MP) tunnels.

BACKGROUND

Several service providers, such as those providing multicast services, e.g., Video over Internet Protocol (VoIP), IP television (IPTV), etc., deliver multicast content from one or more head-end nodes (e.g., Points of Presence, or POPs) to one or more tail end nodes (e.g., several tail-end nodes per head-end node) over a point-to-multipoint (P2MP) tunnel. In one scenario, the head-end node receives the multicast traffic from a multicast network and transmits the multicast traffic onto the P2MP tunnel. Also, the tail-end node receives the tunneled traffic, and forwards the received traffic to another multicast network located at the tail-end node, for example, to reach end-user devices (client televisions, etc.). Notably, the P2MP tunnel, e.g., established using Multiprotocol Label Switching (MPLS) Traffic Engineering (TE), offers a tunnel connection through the service provider's (and others') network, which, as those skilled in the art will understand, allows for various tunnel advantages to be achieved through the network, such as bandwidth reservation, etc.

One particular benefit of a tunnel is its ability to provide "Fast Reroute" (FRR) functionality to protect against intermediate node failure along a primary tunnel. That is, an FRR backup tunnel may be established to protect one or more nodes (or links) along the primary tunnel and, in the event the node (or link) fails, the point of local repair (PLR) quickly reroutes the primary tunnel traffic onto the backup tunnel to circumvent the failed element. However, because the FRR backup tunnel generally needs to intersect the primary tunnel (i.e., the backup tunnel generally starts and ends at the primary tunnel), failure protection is generally not available to a head-end node and a tail-end node of the tunnel.

For instance, for a P2MP tunnel receiving multicast traffic, in the event that a tail-end node of the P2MP tunnel fails, then the head-end node of the P2MP tunnel is notified of the failure. In response, the head-end node recomputes its P2MP tunnel to a new set of tail-end nodes, particularly to the same set as the original P2MP tunnel, but with a replacement for the failed tail-end node. This process generally takes considerable time, and may require cumbersome configuration (e.g., manual configuration). Particularly, computing and signaling a P2MP tunnel generally requires more time than a conventional point-to-point (P2P) tunnel, and requires signaling and processing of the signals at each node of the P2MP tunnel.

BRIEF DESCRIPTION OF THE DRAWINGS

The above and further advantages of the invention may be better understood by referring to the following description in conjunction with the accompanying drawings in is which like reference numerals indicate identically or functionally similar elements, of which.

DESCRIPTION OF EXAMPLE EMBODIMENTS

Overview

According to embodiments of the disclosure, a primary tail-end node (PTE) of a point-to-multipoint (P2MP) tunnel selects a backup tail-end node (BTE) from one or more BTEs that are configured to forward traffic to a same multicast network as the PTE. The PTE then determines a branching node of the P2MP tunnel to reach the PTE and the selected BTE, and notifies the branching node of the selected BTE. In response, the branching node establishes a backup tunnel to the selected BTE, and redirects P2MP traffic onto the backup tunnel to the selected BTE in response to a detected failure of the PTE.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
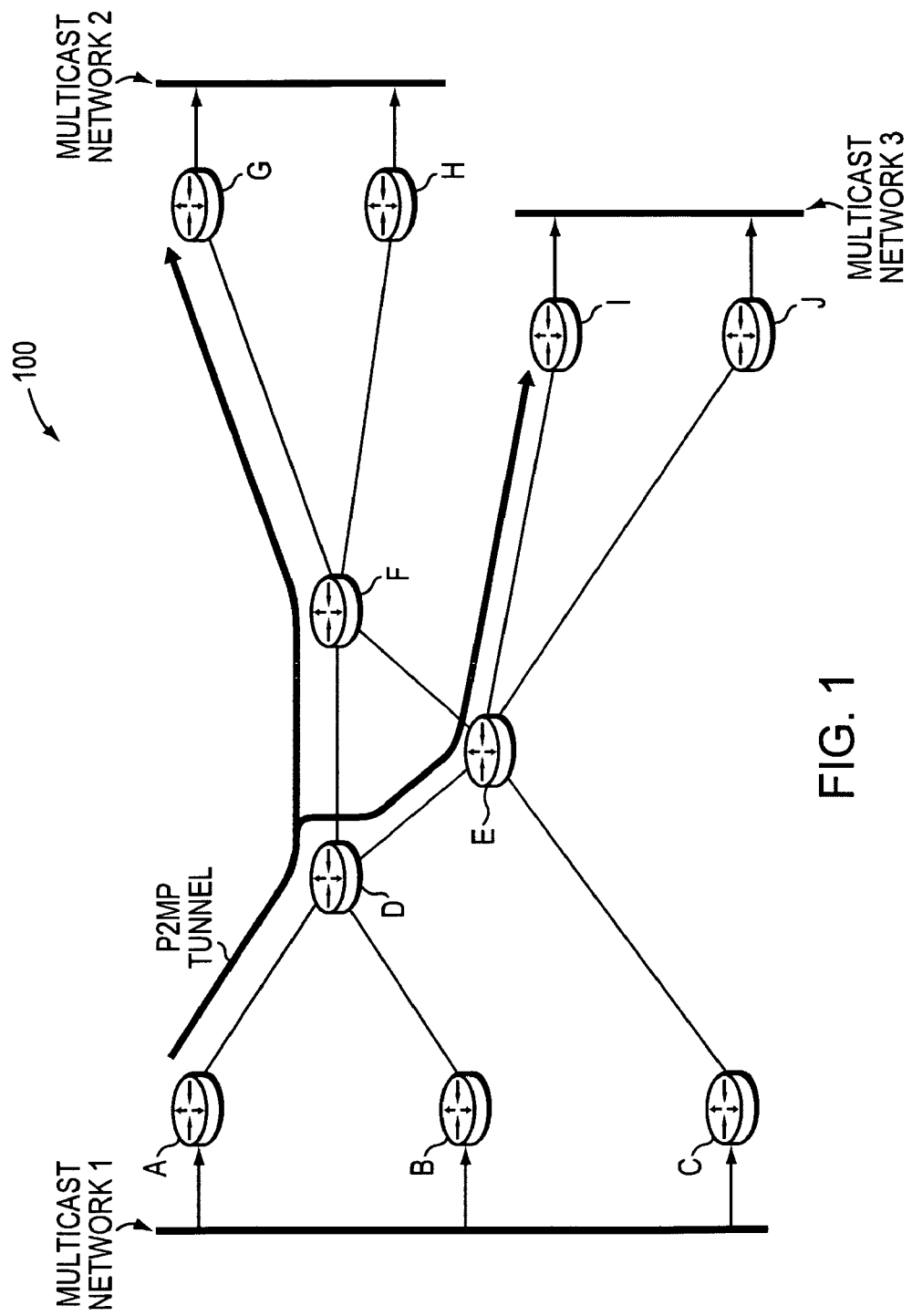
FIG. 1 illustrates an example computer network.

FIG. 1 is a schematic block diagram of an example computer network 100 illustratively comprising nodes (e.g., routers) A-J interconnected by links as shown. Illustratively, nodes A-C are interconnected with a first multicast network "multicast 1" (e.g., a LAN), nodes G-H are interconnected with a second multicast network "multicast 2", and nodes I-J are interconnected with a third multicast network "multicast 3". Those skilled in the art will understand that any number of nodes, routers, links, etc. may be used in the computer network and interconnected in any manner, and that the view shown herein is for simplicity. Data packets may be exchanged among the nodes of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
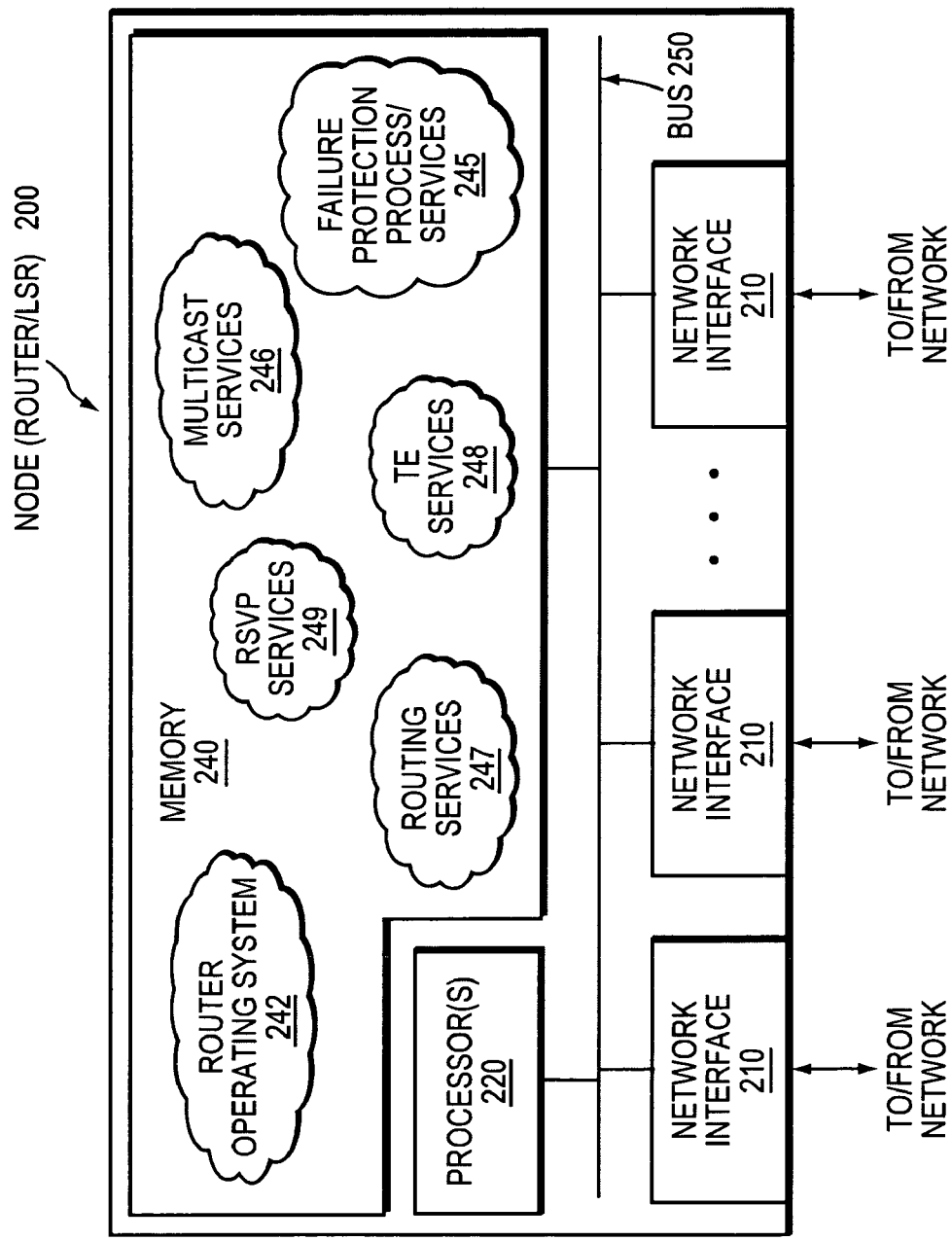
FIG. 2 illustrates an example node/router.

FIG. 2 is a schematic block diagram of an example node/router 200 that may be advantageously used with one or more embodiments described herein, e.g., as a tail-end node (label switched router, "LSR"). The node comprises a plurality of network interfaces 210, one or more processors 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by each processor 220 and the network interfaces 210 for storing software programs and data structures associated with the present invention. The processor(s) 220 may comprise necessary elements or logic adapted to execute the software programs and manipulate the data structures. A router operating system 242 (e.g., the Internetworking Operating System, or IOS™, of Cisco Systems, Inc.), portions of which are typically resident in memory 240 and executed by the processor, functionally organizes the node by, inter alia, invoking network operations in support of software processes and/or services executing on the router. These software processes and/or services may comprise routing services 247, Resource ReSerVation Protocol (RSVP) services 249, Traffic Engineering (TE) services 248, multicast services 246, and as described herein, a failure protection service/process 245 (e.g., a tail-end node failure protection process). It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage routing and forwarding information databases (not shown) containing, e.g., data used to make routing and forwarding decisions. Notably, routing services 247 may also perform functions related to virtual routing protocols, such as maintaining VRF instances (not shown) as will be understood by those skilled in the art.

Changes in the network topology within the local domain (network 100) may be communicated among routers 200 within the network 100 using IGP services, such as the conventional OSPF and IS-IS link-state protocols. Suppose, for example, that a communication link fails or a cost value associated with a network node changes. Once the change in the network's state is detected by one of the routers, that router may flood an IGP advertisement/message communicating the change to the other routers in the network. In this manner, each of the routers eventually "converges" to an identical view of the network topology.

Figure 3:
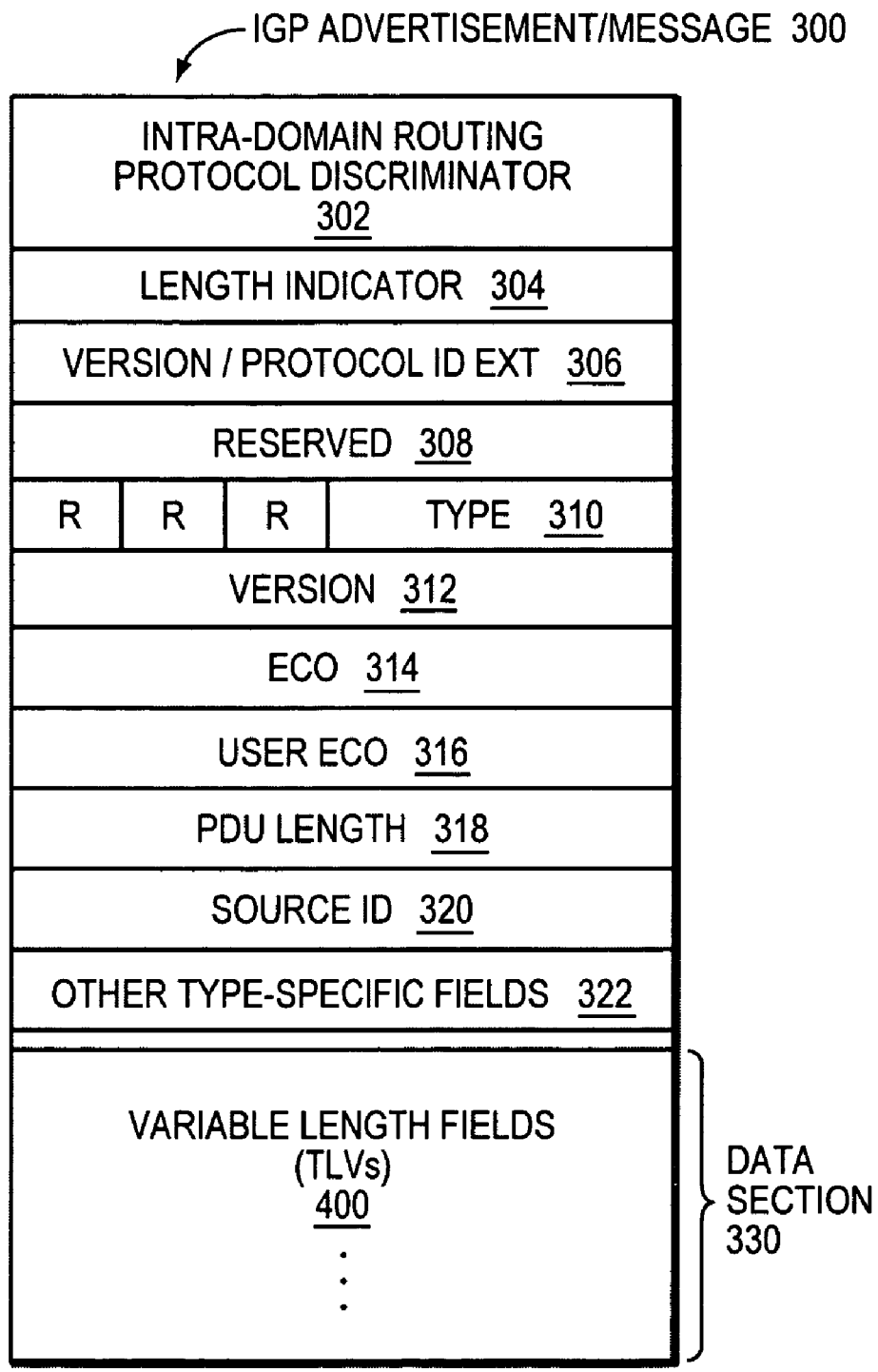
FIG. 3 illustrates an example IGP advertisement.

FIG. 3 illustrates an example IGP advertisement 300 that may be flooded by the routers 200. Illustratively, IGP advertisement 300 is shown as an IS-IS link state packet. Those skilled in the art will understand, however, that other IGP advertisements may be used in accordance with the one or more embodiments described herein, such as, e.g., OSPF link state advertisements, etc. The advertisement 300 includes an intra-domain routing protocol discriminator field 302 that stores a value identifying the specific protocol of the message (e.g., IS-IS), and a length indicator field 304 that stores a value indicating the length of the standard header for the advertisement. Also, a version/protocol ID extension (ext) field 306 may be used to further store a value defining the particular version of the protocol. Reserved field 308 and "R" fields are reserved for future use with the protocol, as are the ECO and User ECO fields 314 and 316, all of which are illustratively ignored by the receiving router until directed for decoding in future versions of the protocol.

A type field 310 (and corresponding version field 312) stores a value indicating the type (and version) of advertisement 300 being transmitted, which may define the existence of other type-specific fields 322 within the advertisement. For example, the type of advertisement may be a link state packet, a "Hello" packet, etc., as will be understood by those skilled in the art. The PDU length field 318 stores a value indicating the length of the entire PDU (Protocol Data Unit, or advertisement 300), including the header, type-specific fields, and data fields. A source ID field 320 stores a value that identifies the router that generated and originally broadcast the advertisement 300.

The other type-specific fields 322 may include any number of fields as defined by the protocol, such as checksum fields, maximum area address fields, etc., as understood by those skilled in the art. For example, a sequence-number field (not shown) may store a sequence number indicating the relative version of the advertisement 300. Typically, the sequence number stored in the field is incremented, e.g., by one, for every new version of the advertisement. The advertisement 300 is therefore considered "stale" (invalid) if its sequence number is less than the sequence number stored in a previously-received version of the advertisement, i.e., generated by the same advertising node. Accordingly, the routers 200 may be configured to store and forward only the most recent version of an advertisement, e.g., the version having the largest sequence number. A remaining lifetime field (not shown) may also be used to store a value that may be used for determining whether the advertisement 300 is valid. The remaining lifetime value is typically initialized to a non-zero integer value, often in units of seconds. The remaining lifetime value may be decremented, e.g., by one every second, until the remaining lifetime value reaches zero, thereby indicating that the advertisement has become invalid. That is, every router 200 that stores or floods the advertisement 300 continuously ages the packet until the remaining lifetime value equals zero. Those skilled in the art will appreciate that other aging mechanisms alternatively may be used, such as incrementing the advertisement remaining lifetime value from an initial value, e.g., equal to zero, until the remaining lifetime value reaches a known upper limit.

The data section 330 includes one or more variable length fields 400, which each have a specific type (or code), length, and value (TLV) as described further herein. For example, to advertise network topology, one or more pairs of neighboring-node fields (not shown) and cost fields (not shown) may be used. The neighboring-node fields may store a value, such as an address, indicating a network node that is directly accessible from the intermediate node identified in the source ID field 320. The cost field may store a value that has been associated, e.g., by the advertising node, with the network node identified in the neighboring-node field. It is noted that in other embodiments, a single neighboring node may be associated with a plurality of cost values. Other routing information may also be included in the variable length fields 400 of the IGP advertisement 300, such as checksum values, padding fields, proprietary fields, etc., and one or more novel "notification" fields (e.g., sub-TLVs in a Router Capability/Information TLV), described further below. Generally, the received IGP advertisements are stored in a link state database (LSDB) of the router 200.

In particular, the TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 4:
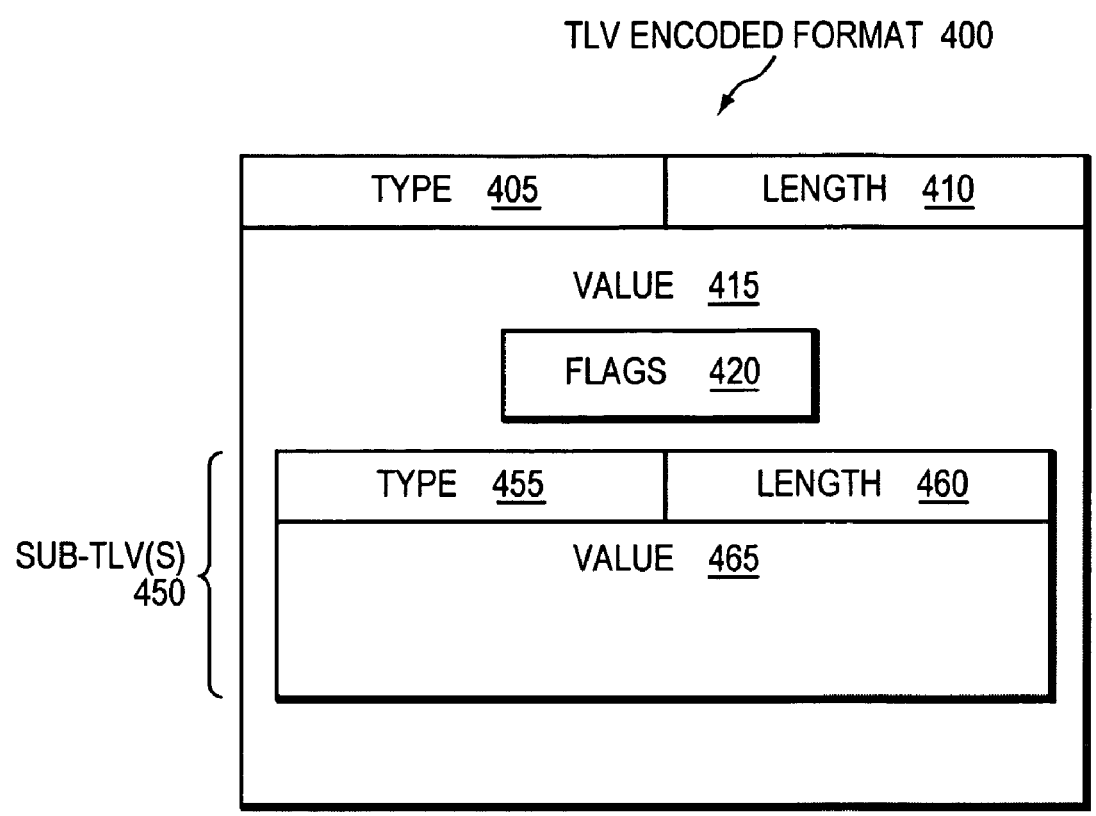
FIG. 4 illustrates an example TLV encoded format.

FIG. 4 is a schematic block diagram illustrating the TLV encoded format 400 that may be advantageously used with the one or more embodiments described herein. The TLV 400 may be used for a variable length field contained in an IGP advertisement 300, or other protocol messages in accordance with the embodiments described herein. The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners, including as described herein, according to the embodiments described herein. Notably, for use with OSPF link state advertisements as IGP advertisements 300, TLVs 400 (e.g., in accordance with the embodiments described herein) may be contained within specific types of advertisements (e.g., Router Information advertisements), or with opaque advertisements, as will be understood by those skilled in the art. The use of IS-IS link state packets, therefore, is merely a representative example.

Multi-Protocol Label Switching (MPLS) Traffic Engineering (TE) has been developed to meet data networking requirements such as guaranteed available bandwidth or fast restoration. MPLS TE exploits modern label switching techniques to build end-to-end tunnels based on a series of constraints through an IP/MPLS network of label switched routers (LSRs). These tunnels are a type of label switched path (LSP) and thus are generally referred to as MPLS TE-LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205, the contents of which are hereby incorporated by reference in their entirety. In the case of traffic engineering applications, RSVP signaling is used to establish a TE-LSP (tunnel) and to convey various TE-LSP attributes to routers, such as border routers, along the TE-LSP obeying the set of required constraints whose path may have been computed by various means.

In particular, RSVP services 249 contain computer executable instructions for implementing RSVP and processing RSVP messages in accordance with the embodiments described herein. Further, TE services 248 contain computer executable instructions for implementing TE functions in accordance with the embodiments described herein. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. A TE database (TED, not shown) may be illustratively resident in memory 240 and used to store TE information provided by the routing protocols, such as IGP, BGP, and/or RSVP. The TED may be illustratively maintained and managed by TE services 248.

Tunnels, e.g., MPLS TE-LSPs, can be configured within a single domain, e.g., area, level, or AS, or may also span multiple domains, e.g., areas, levels, or ASes, and may have guaranteed bandwidth under certain conditions. Illustratively, the tunnels (e.g., TE-LSPs) may be signaled through the use of the RSVP protocol (with Traffic Engineering extensions), and in particular, RSVP TE signaling messages. It should be understood that the use of RSVP serves only as an example, and that other communication protocols may be used in accordance with the embodiments described herein.

Establishment of a tunnel (e.g., TE-LSP) requires computation of a path between a head-end node (LSR) to a tail-end node, signaling along the path, and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. Path computation can either be performed by the head-end node or by some other entity operating as a path computation element (PCE) not co-located on the head-end node. The head-end node (or a PCE) exploits its knowledge of network topology and resources available on each link to perform the path computation according to the LSP Traffic Engineering constraints. Various path computation methodologies are available including CSPF (constrained shortest path first).

An example tunnel is shown in FIG. 1 as the thick lines with arrows from node A to nodes G and I. Notably, this type of "branching" tunnel is referred to as a "point-to-multipoint" (P2MP) tunnel, originating at one point (head-end node, node A), and terminating at multiple points (tail-end nodes, nodes G and I). Illustratively, the P2MP tunnel may be configured (e.g., computed and established) to receive multicast traffic from a multicast network (multicast 1) at the head-end node (node A), such as, e.g., Video over IP, IPTV, or any other multicast traffic, as will be understood by those skilled in the art. The traffic traverses the P2MP tunnel, is duplicated at node D, and arrives at each of the tail-end nodes (nodes G and I). The tail-end nodes, in turn, may forward the received traffic onto their locally attached multicast networks (multicast 2 and 3, respectively), such as to deliver the content to one or more user/client devices within the multicast networks.

As noted, while failure protection such as Fast Reroute (FRR) may generally be available for intermediate nodes/links of the P2MP tunnel, tail-end node failure protection (particularly for a P2MP tunnel receiving multicast traffic) is generally unavailable to service providers. Conventional approaches used to react to tail-end node failure are inefficient, requiring excessive time and resources to accommodate the failure. In essence, conventional tail-end node protection involves reacting to the failure by reestablishing the entire network configuration (i.e., resignaling a new P2MP tunnel to the tail-end nodes and a replacement for the failed tail-end node).

Tail-End Node Failure Protection

According to embodiments of the disclosure, a primary tail-end node (PTE) of a P2MP tunnel selects a backup tail-end node (BTE) from one or more BTEs that are configured to forward traffic to a same multicast network as the PTE. The PTE then determines a branching node of the P2MP tunnel to reach the PTE and the selected BTE, and notifies the branching node of the selected BTE. In response, the branching node establishes a backup tunnel to the selected BTE, and redirects P2MP traffic onto the backup tunnel to the selected BTE in response to a detected failure of the PTE.

Operationally, a head-end node (e.g., node A, for example, a provider edge device of a service provider's point-of-presence, or POP) receives multicast traffic from a multicast network (multicast 1), such as a LAN. This node is selected to actively carry (forward) the multicast traffic into the network 100 over a P2MP tunnel to one or more selected tail-end nodes (e.g., nodes G and I), hereinafter the "PTEs", to reach receiving multicast networks (multicast 2 and 3, respectively).

Illustratively, each tail-end node that is not selected as a PTE for its multicast network may be configured to provide backup capabilities for the PTE in accordance with one or more embodiments described herein, i.e., as BTEs (e.g., nodes H and J). This backup capability may be advertised within an IGP advertisement/message 300, such as within a novel sub-TLV 450 of an IS-IS Router Capability TLV 400 or a Router Information link state advertisement for OSPF, as will be appreciated by those skilled in the art. In this manner, the PTE may dynamically learn of the one or more BTEs through conventional advertisement propagation. Alternatively, the PTE may be manually configured with possible BTE candidates, or may be configured to assume that nodes/routers in communication with their respective multicast network (multicast 2 or 3) may be BTEs (e.g., learned from IGP advertisements 300), etc.

To select a particular BTE as the backup for the PTE (the "selected BTE"), the PTE may use one or more selection criteria, such as one or more dynamic capabilities of the BTEs and/or a location of the BTEs. For instance, dynamic capabilities of the BTEs (e.g., advertised through TLV extensions 400 within IGP advertisements 300 or through explicit notification, or manually configured at the PHE) may comprise, inter alia, processing ability (e.g., sufficient processing resources to handle two gigabits/second of data), backup availability under certain restrictions (e.g., higher than a certain priority level, only on weekends, only between 7:00 AM and 7:00 PM, etc.). Location, on the other hand, may generally be in relation to the PTE and/or the P2MP tunnel and nodes along the tunnel. For example, the selected BTE is able to forward the multicast traffic onto the same multicast network as the PTE (e.g., to multicast 2 for PTE node G). In addition to being interconnected with the multicast network, however, location may also take into consideration whether a first potential BTE may only be reached via a second potential BTE. In this case, it may not be necessary to traverse the second BTE to reach the first, but rather to simply select the second BTE.

Notably, notifications (e.g., explicit notifications and/or requests/responses described herein) may be exchanged between the PTE, branching node, and BTEs using IGP advertisements 300 above, or, illustratively, in accordance with a protocol specified in Vasseur, et al., *Path Computation Element (PCE) Communication Protocol (PCEP)—Version 1*—<draft-ietf-pce-pcep-03.txt>, Internet Draft, October 2006, the contents of which are hereby incorporated by reference in their entirety. It should be understood that the use of PCEP serves only as an example, and that other communication protocols may be used in accordance with the present invention.

Figure 5:
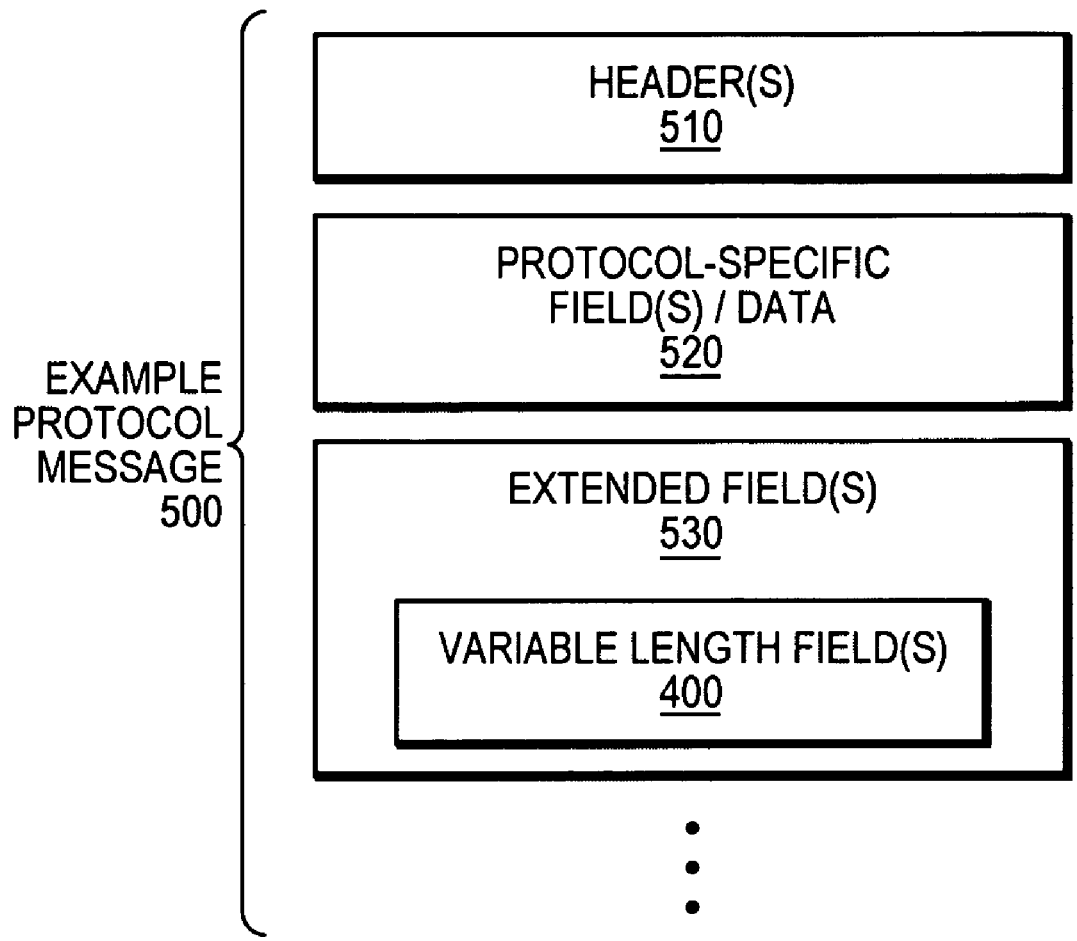
FIG. 5 illustrates a generic protocol message.

FIG. 5 is a schematic block diagram illustrating a generic protocol message 500 that may be transmitted by nodes/routers 200 (PTE, branching node, and BTEs) according to various protocols in accordance with the embodiments described herein, e.g., a PCEP message 500, etc. Illustratively, the message 500 is shown as a high-level generic message, and those skilled in the art will understand that more specific messages may comprise other fields accordingly. The message 500 includes one or more headers 510, such as an encapsulation protocol header as well as one or more protocol-specific headers (e.g., IP headers, RSVP headers, etc.). As those skilled in the art will understand, the message 500 is sent in an encapsulation appropriate to the environment (e.g., TCP/IP, ATM, MPLS, etc.). Thus, the encapsulation protocol header of headers 510 contains information standard for the specific type of encapsulation. Protocol-specific fields/data 520 may be used to contain protocol-specific information, as will be understood by those skilled in the art. For example, a PCEP message 500 may communicate PCEP-specific information between the PTE, branching node, and BTEs, accordingly. Regardless of the protocol, the extended field(s) section 530 (e.g., an extension to protocol-specific fields) may include one or more variable length fields (TLVs) 400, to be used in accordance with one or more embodiments described herein.

After selecting a BTE (e.g., node H), the PTE (e.g., node G) may then determine an appropriate branching node of the P2MP tunnel to reach the PTE and the selected BTE. For example, the PTE may use one or more selection criteria similar to those for selecting the BTE, such as one or more dynamic capabilities of the branching nodes and a location of the branching nodes. In particular, an important consideration for the latter selection criterion is that the branching node be located on the P2MP tunnel, and also that the branching node can reach the PTE and the selected BTE. For example, node F in network 100 is an intermediate node of the P2MP tunnel, and is the closest branching node to reach both the PTE and BTE. Assuming node F is able to comply with tail-end node failure protection (e.g., based on one or more dynamic capabilities), the PTE may select node F as the branching node. Those skilled in the art will understand that any intermediate node along the P2MP tunnel may be used (e.g., node D), but that the closer the branching node is to the selected BTE, the fewer resources are required to maintain the backup tunnel, as described herein.

Once the PTE determines an appropriate branching node (e.g., node F), the PTE notifies the branching node that it has been selected. For instance, the notification message (e.g., a PCEP message 500) requests that the branching node provide tail-end node failure protection in accordance with one or more embodiments described herein, and may include a pre-computed backup tunnel computed by the PTE, or, illustratively, a request that the branching node compute a backup tunnel itself. In particular, where the pre-computed backup tunnel is not included, the PTE may inform the branching node of the selected BTE to which the backup tunnel should be established.

The branching node computes the backup P2MP tunnel from itself to the selected BTE, e.g., considering one or more characteristics of the P2MP tunnel that should be maintained in the backup tunnel. For example, characteristics may comprise, inter alia, required bandwidth, affinities (color, etc.), priority, limitations/constraints, etc. of the P2MP tunnel. (Notably, it may also be possible to provide a different set of characteristics for the backup tunnel, such as lessened constraints, etc., for the backup, as described below.) Because the branching node is already an intermediate node of the P2MP tunnel, it knows of the characteristics of the P2MP tunnel, e.g., from a Path message (e.g., an RSVP Path message) used to establish and maintain state of the P2MP tunnel, as will be understood by those skilled in the art. In this manner, the branching node may compute a backup tunnel (e.g., point-to-point, P2P) to the selected BTE that is suitable to carry traffic for the P2MP tunnel. As those skilled in the art will appreciate, it is important that the branching node also compute the backup tunnel to ensure that the backup tunnel does not traverse the protected PTE.

Figure 6:
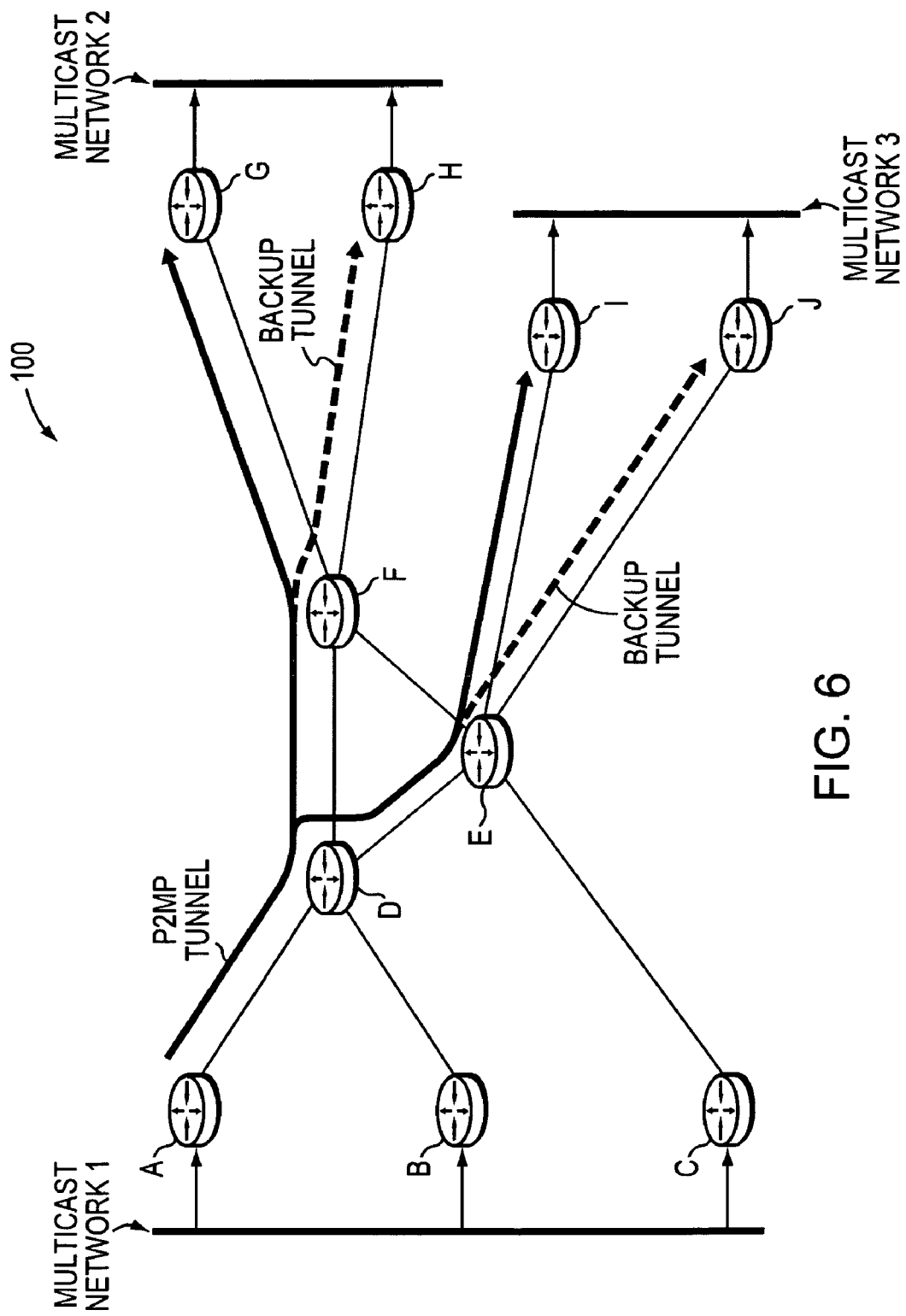
FIG. 6 illustrates the example computer network of FIG. 1 having computed backup tunnels.

FIG. 6 illustrates the computer network 100 of FIG. 1 having computed backup tunnels in accordance with one or more embodiments described herein. For instance, for one PTE (e.g., node G), a branching node (e.g., node F) may compute a backup tunnel (shown as the dashed line) to the selected BTE (e.g., node H) for the multicast network of the PTE (multicast 2). Also, for another PTE (e.g., node I), a branching node (e.g., node E) may compute a backup tunnel to the selected BTE (e.g., node J) for the multicast network of the other PTE (multicast 3).

Upon computing (or receiving) the path for the backup tunnel, the branching node (e.g., node F) may establish the backup tunnel accordingly (e.g., the dashed line between node F and node H). Illustratively, the backup tunnel may be established having a same reserved bandwidth as a segment of the P2MP tunnel (a "primary segment") from the branching node to the PTE (e.g., the link between node F and node G). As an alternative, in order to reduce resource consumption in the network 100, the backup tunnel may be established with zero bandwidth, and resignaled to the bandwidth of the primary segment in response to redirecting the P2MP traffic onto the backup tunnel (described below).

Notably, as another enhancement to reduce resource consumption in the network 100, the backup P2MP tunnel may be established such that trunks (links) shared with the P2MP tunnel are not "double booked," i.e., are not reserved twice for the same traffic when only one tunnel will carry the traffic at a given time. For instance, a "shared explicit" (SE) mode in RSVP, as will be understood by those skilled in the art and as described in above-incorporated RFC 3209, may be used during signaling of the backup tunnel to instruct intermediate nodes along the backup tunnel (and the P2MP tunnel) to not double book the shared resources. For example, if a branching node were to utilize a portion of the path of the P2MP tunnel for the backup tunnel (e.g., if node D were the branching node for BTE node H), some links may be shared between the backup tunnel and the P2MP tunnel (e.g., the link between nodes D and F).

Yet another enhancement to reduce resource consumption in the network 100 is to establish the backup tunnel initially with a (comparatively) low priority. In this manner, other traffic that may utilize the same resources of the backup tunnel (e.g., bandwidth on the backup tunnel path between node F and node H) may preempt the backup tunnel if the other traffic has a higher priority level. The backup tunnel may then be resignaled to a higher priority level in response to redirecting the P2MP traffic onto that tunnel (described below), thus rendering the backup tunnel less likely to be preempted by other traffic.

According to one or more embodiments described herein, the branching node (e.g., node F) may notify the PTE as to whether the backup tunnel has been successfully established, such as with a PCEP message 500. In the event that the branching node did not successfully establish the backup tunnel (or if the branching node is unable to comply for other reasons, such as not being configured to comply, etc.), the PTE may select a different branching node (e.g., node D) along the P2MP tunnel in accordance with the selection techniques described above, or, if necessary, a different BTE as well. Also, the selected BTE may be notified that it has been selected as a backup for the PTE, such as for monitoring purposes or to initiate one or more services to prepare for receipt of redirected traffic in the event of a PTE failure.

Once the backup tunnel is established, the branching node (node F) monitors for failure of the PTE (node G). For example, the branching node may determine that the PTE has failed in response to a connectivity protocol exchange, such as "keepalive" messages, "hello" messages, "pings" (e.g., ICMP echo requests), a bidirectional forwarding detection (BFD) exchange, an IGP advertisement 300 update, etc., each as will be understood by those skilled in the art. Upon detecting a failure of the PTE, the branching node redirects forwarding of the tunnel traffic onto the backup tunnel, thus offering failure protection for the PTE (e.g., FRR protection). (Note that in steady state, with a non-failed PTE, no redirection or duplication of tunnel traffic is performed by the branching node.) The forwarded traffic then continues to reach the selected BTE (node H) accordingly, which may forward the traffic over the multicast network (multicast 2) of the failed PTE. Notably, if the backup tunnel traverses a portion of the P2MP tunnel (e.g., a shared segment) that does not lead to the failed PTE (not shown) the branching node that redirects the traffic to the selected BTE may send multiple copies of the traffic, i.e., one for the P2MP tunnel to any non-failed PTEs, and one for each backup P2MP tunnel to respective selected BTEs.

Upon detecting that the PTE has "reappeared" (e.g., has come back online, has been repaired, etc.) while forwarding traffic onto the backup tunnel (i.e., in response to a PTE failure), the branching node may determine whether to maintain forwarding of the multicast traffic over the backup tunnel to the BTE or to return forwarding responsibilities of the multicast traffic to the PTE. For example, if the PTE has reappeared (e.g., for a configurable length of time, to account for potentially "flapping" nodes/links that fail and reappear frequently), the branching node may determine whether the original PTE is an improvement (e.g., lower cost tunnel, etc.) over the selected BTE, e.g., by some configurable threshold (e.g., a 10% gain). If so, the branching node may return forwarding responsibilities of the multicast traffic to the PTE, e.g., after the P2MP is reestablished to the PTE (e.g., it may have been torn down to the failed PTE). Otherwise, the branching node continues to forward the traffic onto the backup tunnel.

Figure 7:
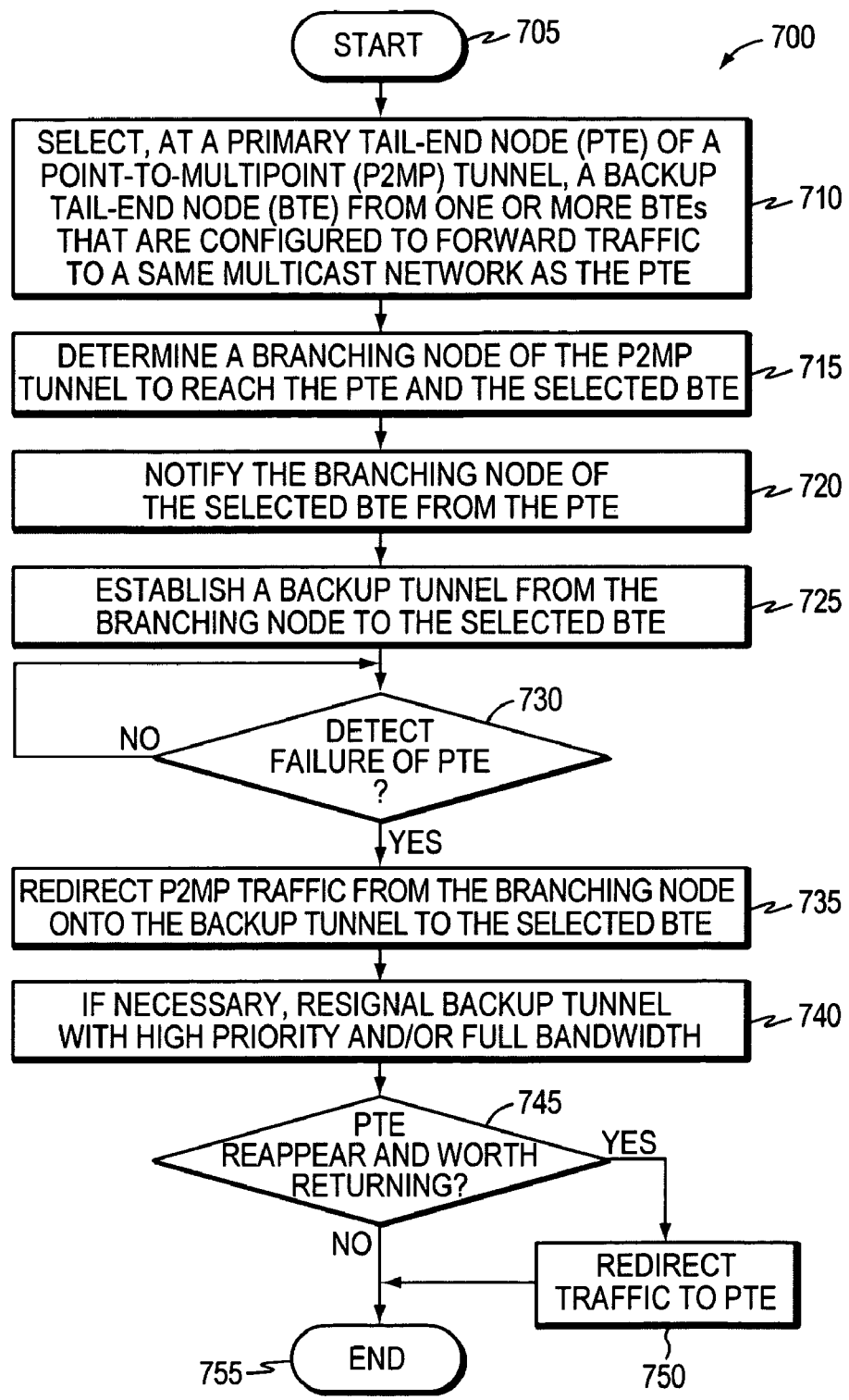
FIG. 7 illustrates an example procedure for protecting against tail-end node failure of a P2MP tunnel.

FIG. 7 illustrates an example procedure for protecting against tail-end node failure of a P2MP tunnel in accordance with one or more embodiments described herein. The procedure 700 starts at step 705, and continues to step 710, where a PTE (e.g., node G) of a P2MP tunnel selects a BTE (e.g., node H) from one or more BTEs that are configured to forward traffic to a same multicast network as the PTE (e.g., multicast 2). Once the BTE is selected, the PTE determines a branching node (e.g., node F) of the P2MP tunnel to reach the PTE and the selected BTE in step 715, and notifies the branching node of the selected BTE in step 720 (e.g., thus requesting tail-end node protection).

In response, the branching node establishes a backup tunnel to the selected BTE in step 725, and monitors for failure of the PTE (e.g., IGP, BFD, etc.) in step 730. Upon detection of a failure, the branching node redirects P2MP traffic onto the backup tunnel to the selected BTE, which then forwards the traffic onto the multicast network (multicast 2) of the PTE. If necessary, as described above, the branching node may resignal the backup tunnel with a high priority and/or full bandwidth in step 740 once the failure of the PTE is detected. If the PTE later reappears and the branching node determines that it is worth returning the multicast forwarding to the PTE (step 745), then the branching node redirects traffic to the PTE in step 750. As a result of either event at step 745, the procedure 700 ends in step 755.

Notably, in the event the PTE selected to receive the multicast traffic from a P2MP tunnel changes (e.g., in response to network reconfiguration by a system administrator or other non-failure reason), the techniques described above may be performed again to reconfigure a (possibly) new BTE accordingly. In addition, if the path of the P2MP tunnel is modified/changes (e.g., as learned through one or more IGP advertisements 300), a new branching node and/or BTE may be selected and/or a new backup tunnel may be established if it is also determined that the new branching node, BTE, and/or backup tunnel would be an improvement (e.g., greater sharing, greater capabilities, etc.) over the original, e.g., by some configurable threshold (e.g., a 10% gain).

Advantageously, the novel techniques described herein protect against tail-end node failure of a P2MP tunnel in a computer network. By having a branching node redirect tunnel traffic from a PTE to a BTE in response to PTE failure, the novel techniques allow for efficient protection of a tail-end node, particularly where the PTE and BTE are configured to forward the tunnel traffic to the same multicast network. In addition, the techniques described above efficiently utilize network resources by optimizing backup tunnel placement and properties, as described above. Further, the dynamic aspects of one or more embodiments described herein alleviate the need for cumbersome and inefficient manual configuration.

While there have been shown and described illustrative embodiments that protect against tail-end node failure of a P2MP tunnel in a computer network, it is to be understood that various other adaptations and modifications may be made within the spirit and scope of the present invention. For example, the embodiments have been shown and described herein for use with a P2MP tunnel. However, the embodiments of the invention in their broader sense are not so limited, and may, in fact, be used with any tail-end node (PTE) of any tunnel (e.g., point-to-point, etc.) that is configured to forward tunnel traffic to the same multicast network as one or more other possible tail-end nodes (BTEs). Also, while the embodiments above describe one or more protocols and protocol messages, those skilled in the art will appreciate that other protocols and messages may be used accordingly, and that those other protocols and messages are within the scope of the present invention. Further, while the above description describes interaction with the PTE, the branching node may be configured to perform tail-end node failure protection without participation from the PTE (e.g., the branching node selects a BTE for a PTE, computes paths, etc.).

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
    selecting a backup tail-end node (BTE) of a point-to-multipoint (P2MP) tunnel, from one or more BTEs that are coupled to a same multicast network as a primary tail-end node (PTE) of the P2MP tunnel;
    determining a branching node of the P2MP tunnel to reach the PTE and the selected BTE;
    notifying the branching node of the selected BTE;
    establishing a backup tunnel from the branching node to the selected BTE; and
    redirecting P2MP traffic from the branching node onto the backup tunnel to the selected BTE in response to a detected failure of the PTE, wherein the steps of selecting, determining, notifying, and establishing are performed in response to a modification of the P2MP tunnel.

2. A method comprising:
selecting a backup tail-end node (BTE) of a point-to-multipoint (P2MP) tunnel, from one or more BTEs that are coupled to a same multicast network as a primary tail-end node (PTE) of the P2MP tunnel;
notifying the selected BTE that it is the selected BTE;
determining a branching node of the P2MP tunnel to reach the PTE and the selected BTE;
notifying the branching node of the selected BTE;
establishing a backup tunnel from the branching node to the selected BTE; and
redirecting P2MP traffic from the branching node onto the backup tunnel to the selected BTE in response to a detected failure of the PTE.

3. A method, comprising:
selecting a backup tail-end node (BTE) of a point-to-multipoint (P2MP) tunnel, from one or more BTEs that are coupled to a same multicast network as a primary tail-end node (PTE) of the P2MP tunnel, wherein the step of selecting is performed at the PTE;
determining a branching node of the P2MP tunnel to reach the PTE and the selected BTE;
notifying the branching node of the selected BTE;
establishing a backup tunnel from the branching node to the selected BTE; and
redirecting P2MP traffic from the branching node onto the backup tunnel to the selected BTE in response to a detected failure of the PTE.

4. The method as in claim 3, further comprising:
computing the backup tunnel at the branching node to not traverse the PTE.

5. The method as in claim 3, further comprising:
detecting failure of the PTE at the branching node in response to at least one of a bidirectional forwarding detection (BFD) exchange, an Interior Gateway Protocol (IGP) update, and a keep alive message exchange.

6. The method as in claim 3, further comprising:
detecting at the branching node that the PTE has reappeared; and
determining whether to continue redirecting the P2MP traffic to the selected BTE or to redirect the P2MP traffic to the PTE.

7. The method as in claim 3, further comprising:
establishing the backup tunnel having a same bandwidth as a primary segment of the P2MP tunnel from the branching node to the PTE.

8. The method as in claim 3, further comprising:
establishing the backup tunnel having zero bandwidth.

9. The method as in claim 8, further comprising:
resignaling the backup tunnel having a same bandwidth as a primary segment of the P2MP tunnel from the branching node to the PTE in response to redirecting the P2MP traffic onto the backup tunnel.

10. The method as in claim 3, further comprising:
establishing the backup tunnel having a low priority.

11. The method as in claim 10, further comprising:
preempting the backup tunnel with high priority traffic.

12. The method as in claim 10, further comprising:
resignaling the backup tunnel having a high priority in response to redirecting the P2MP traffic onto the backup tunnel.

13. The method as in claim 3, further comprising:
receiving the P2MP traffic at the selected BTE; and
forwarding the P2MP traffic to the multicast network.

14. The method as in claim 3, further comprising:
selecting a BTE such that a backup tunnel to the selected BTE does not traverse another BTE.

15. A primary tail-end node (PTE), comprising:
one or more network interfaces configured to receive point-to-multipoint (P2MP) traffic over a P2MP tunnel and to forward the P2MP traffic onto a multicast network;
one or more processors coupled to the network interfaces and configured to execute one or more processes; and
a memory configured to store a tail-end failure protection process executable by each processor, the failure protection process when executed configured to: i) select a backup tail-end node (BTE) of the P2MP tunnel, from one or more BTEs that are coupled to a same multicast network as the PTE, ii) notify the selected BTE that it is the selected BTE; iii) determine a branching node of the P2MP tunnel to reach the PTE and the selected BTE, iv) notify the branching node of the selected BTE, and v) request that the branching node establish a backup tunnel from the branching node to the BTE and redirect P2MP traffic from the branching node onto the backup tunnel to the BTE in response to a detected failure of the PTE.

16. A branching node, comprising:
one or more network interfaces configured to receive and transmit point-to-multipoint (P2MP) traffic over a P2MP tunnel;
one or more processors coupled to the network interfaces and configured to execute one or more processes; and
a memory configured to store a tail-end failure protection process executable by each processor, the failure protection process when executed configured to: i) receive a notification from a primary tail-end node (PTE) of the P2MP tunnel, the notification indicating a selected backup tail-end node (BTE) of the P2MP tunnel, from one or more BTEs that are coupled to a same multicast network as the PTE, ii) establish a backup tunnel from the branching node to the BTE, iii) redirect P2MP traffic onto the backup tunnel to the BTE in response to a detected failure of the PTE, iv) detect that the PTE has reappeared, and v) determine whether to continue redirecting the P2MP traffic to the selected BTE or to redirect the P2MP traffic to the PTE.

17. The node as in claim 16, wherein the failure protection process is further configured to:
establish the backup tunnel having a same bandwidth as a primary segment of the P2MP tunnel from the branching node to the PTE.

18. The node as in claim 16, wherein the failure protection process is further configured to:
establish the backup tunnel having zero bandwidth.

19. The node as in claim 16, wherein the failure protection process is further configured to:
establish the backup tunnel having a low priority; and
resignal the backup tunnel having a high priority in response to redirecting the P2MP traffic onto the backup tunnel.

* * * * *